Figures 1, 2, 3, 4:
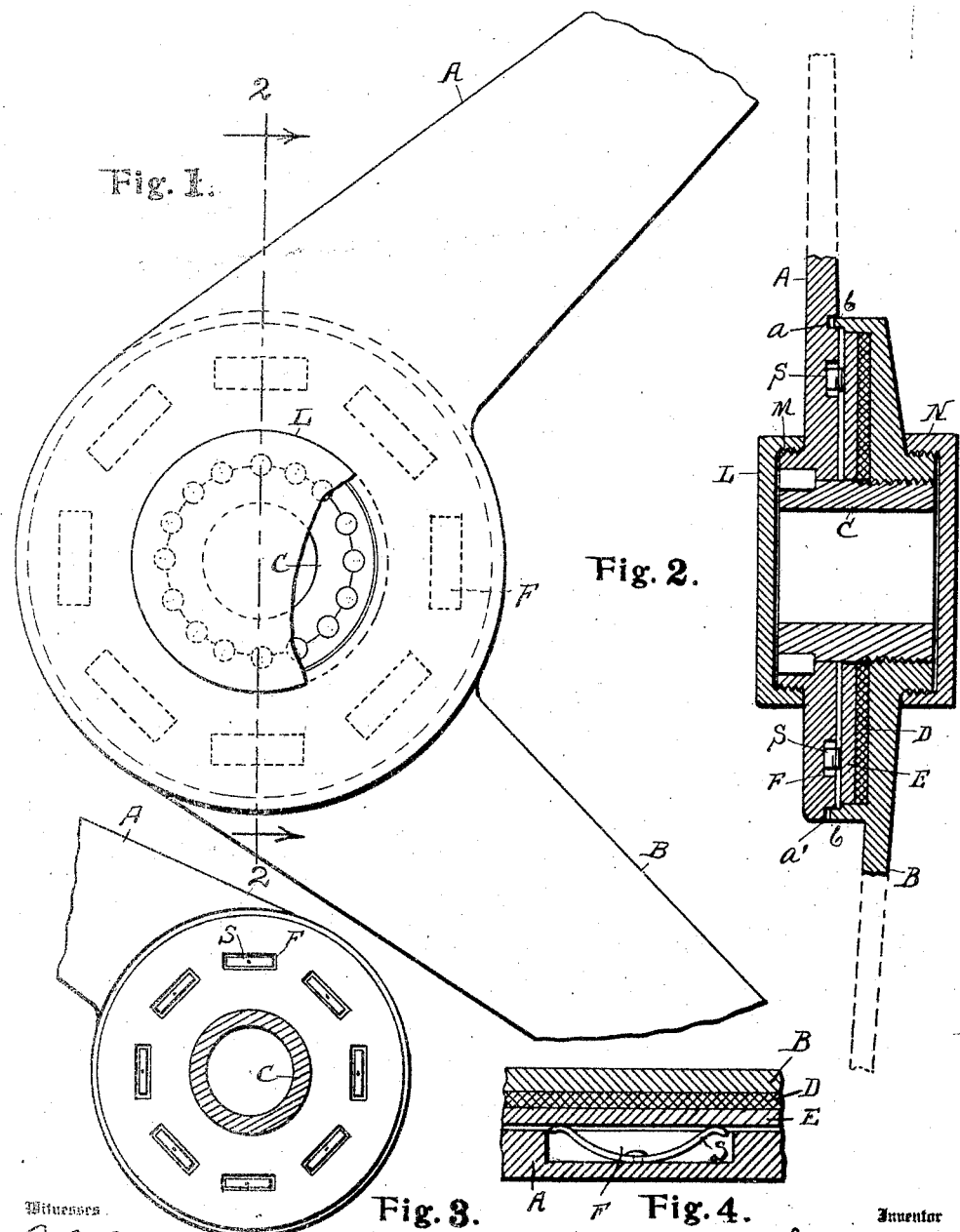

W. J. KING.
RECOIL ARRESTER.
APPLICATION FILED MAY 21, 1910.

1,038,390.

Patented Sept. 10, 1912.

Witnesses

Inventor
William J. King
By Parker & Burton
Attorneys

UNITED STATES PATENT OFFICE.

WILLIAM J. KING, OF GRAND BLANC, MICHIGAN.

RECOIL-ARRESTER.

1,038,390.

Specification of Letters Patent. Patented Sept. 10, 1912.

Application filed May 21, 1910. Serial No. 562,601.

*To all whom it may concern:*

Be it known that I, WILLIAM J. KING, a citizen of the United States, residing at Grand Blanc, county of Genesee, State of Michigan, have invented a certain new and useful Improvement in Recoil-Arresters, and declare the following to be a full, clear, and exact description of the same, such as will enable others skilled in the art to which it pertains to make and use the same, reference being had to the accompanying drawings, which form a part of this specification.

My invention relates to recoil arresters and consists in the combinations and arrangements hereinafter described and specifically pointed out in the claims.

In the drawings,—Figure 1, is a vertical elevation of my recoil arrester. Fig. 2, is a sectional view on the lines 2—2, Fig. 1. Fig. 3, is a plan view of enlarged end of arm A, showing spring pockets. Fig. 4, is a cross section of one of these pockets with spring attached to the washer.

Similar letters refer to similar parts.

This arrester is formed of two angular arms; A represents one arm thereof; B represents the other arm; these arms may be connected, one to the axle of a spring supported vehicle, and the other to the frame. Each of these arms at their junction is enlarged, and one of them, B, is formed into a cup by an annular elevation $b$, $b$, thereon, as shown in Fig. 2; the two arms are pivotally united by a hollow bolt of peculiar construction, which is shown in Fig. 2, at C. The enlargement of the arm A, has formed therein a curved groove $a$ at one portion thereof, and continued by a curved recess around its periphery at $a^1$. This annular groove and recess combined is adapted to receive the annular lip $b$, of the cup formed on the arm B, and being concentric with the axis of the bolt C, allows the edge of the lip to turn in the groove and recess. Between these two enlargements there is interposed, first, a leather or fiber washer D, and second, a metal disk or washer E. In the series of pockets F, F, formed on the inner face of the enlargement of arm A are interposed springs S, S, substantially tangential to the circle made by the pockets. These springs are as shown in Fig. 4, and are attached at their crowns to the disk-like enlargement of the arm A. By this arrangement the friction disk E, is prevented from turning except with the arm A. After the assembling of the parts the springs push or crowd the washer E, against the fiber washer D, with any assignable or adjustable pressure, depending upon the tension of the spring, the same being adjusted as hereinafter stated. The bolt C is threaded in the cup formed in the arm B, as shown in Fig. 2, and if the bolt be rigidly held it is obvious that a turning movement of the arm B, thereon would draw the arm B in or out upon the bolt in proportion to the amount of the turning and to the pitch of the screw threads.

The arm A is locked to the bolt by a series of pins and pin-holes, the pin-holes being partially formed in both the enlargement of the arm A and the bolt, and being spaced rather closely together enables the bolt to be adjusted by withdrawing the pins and turning the bolt a distance sufficient to adjust it one pin-hole or more, and then locking it by replacing them. Obviously, therefore, the arm A in its movement would turn the bolt C and the movement of the arm B being contradistant from that of arm A, the arm B must turn upon the threads H and thus tend to compress the fiber washer E or to release it by the reverse movement upon the screw threads.

In order to make a neat appearance and prevent the pins from dropping out, a screw cap L is attached to a hub or projection M, by being screwed thereon tightly thus holding the pins in proper relation and covering the opening in the bolt C, also giving the whole a finished appearance. Another screw cap N, is attached to an enlargement of the arm B and also closes the opposite end of the hollow bolt C and gives the whole structure a finished appearance; about these there is nothing specially novel, the latter one having no other office than that of merely closing up the opening, finishing the appearance.

Having thus described my invention what I desire to claim is:

1. In a recoil arrester, the combination of two pivotally connected arms, one of said arms being adapted to be connected to a spring-supported frame of a vehicle and the other to the axle thereof, friction members between the meeting faces of said pivotally connected arms, a plurality of flat springs arranged in pockets of the face of one of the arms, the said pockets encircling the face and the springs adapted to press the friction members into frictional relation with each other and the face of the other arm, and means for causing the said springs to exert a different pressure on said friction members when said arms are moved relatively, substantially as described.

2. In a recoil arrester, the combination of two arms, one arm being provided with a central threaded aperture and the other arm being provided with a cylindrical aperture having half cylindrical recesses cut into the said arm, one of the arms being adapted to be connected to a spring supported frame of a vehicle and the other to the axle thereof, a bolt having at one end a threaded portion adapted to engage in the said threaded aperture and having at the other end a plurality of half cylindrical recesses in its periphery, any one of said recesses being adapted to be turned to register with any one of several of the recesses in the arm, pins adapted to be inserted in the cylindrical hole formed by two of said recesses registering and resilient means for affording frictional contact between the said arms, substantially as described.

In testimony whereof, I sign this specification in the presence of two witnesses.

WILLIAM J. KING.

Witnesses:
R. A. PARKER,
N. V. BELLES.